(12) United States Patent
Porter (10) Patent No.: US 12,540,508 B2
(45) Date of Patent: Feb. 3, 2026

(54) PIPE ADAPTER FOR LADDER PLACEMENT

(71) Applicant: Timothy Porter, New Windsor, NY (US)

(72) Inventor: Timothy Porter, New Windsor, NY (US)

( * ) Notice: Subject to any disclaimer, the term of this patent is extended or adjusted under 35 U.S.C. 154(b) by 707 days.

(21) Appl. No.: 17/903,249

(22) Filed: Sep. 6, 2022

(65) Prior Publication Data
US 2024/0076940 A1    Mar. 7, 2024

(51) Int. Cl.
E06C 7/46    (2006.01)
E04G 3/24    (2006.01)
F16M 11/22   (2006.01)

(52) U.S. Cl.
CPC .................. *E06C 7/46* (2013.01); *E04G 3/24* (2013.01); *F16M 11/22* (2013.01); *F16M 2200/08* (2013.01)

(58) Field of Classification Search
CPC .... E06C 7/44; E06C 7/46; E04G 3/24; F16M 11/22; F16M 2200/08
See application file for complete search history.

(56) References Cited

U.S. PATENT DOCUMENTS

| | | | |
|---|---|---|---|
| 1,190,421 A * | 7/1916 | Kalcy | A63B 25/00 623/28 |
| 2,971,602 A * | 2/1961 | West | E06C 7/44 182/200 |
| 3,199,628 A * | 8/1965 | Fagaly | E06C 7/44 182/200 |
| 4,591,023 A * | 5/1986 | Hodson | E06C 7/44 182/200 |
| 4,846,303 A | 7/1989 | Cooper et al. | |
| 5,181,583 A * | 1/1993 | Platt | E06C 1/16 182/112 |
| 5,373,913 A | 12/1994 | Santos | |
| 6,250,424 B1 | 6/2001 | Laug | |
| 6,907,957 B1 | 6/2005 | Couch | |
| 7,530,767 B2 | 5/2009 | Davidson, Sr. | |
| 7,845,468 B2 | 12/2010 | Steblinski | |
| D757,302 S | 5/2016 | Copp | |
| 2010/0133406 A1 * | 6/2010 | Jones | F16M 11/125 248/346.03 |
| 2016/0369563 A1 | 12/2016 | Adcock et al. | |
| 2017/0009528 A1 * | 1/2017 | Pascut | E06C 7/06 |
| 2020/0003008 A1 | 1/2020 | Heitkamp et al. | |
| 2022/0081972 A1 * | 3/2022 | Haines | E06C 7/50 |
| 2024/0182139 A1 * | 6/2024 | Hammond | F16M 11/22 |

FOREIGN PATENT DOCUMENTS

CA    2821455 A1    9/2014

* cited by examiner

*Primary Examiner* — Brian D Mattei
(74) *Attorney, Agent, or Firm* — Michael J. Feigin, Esq.; Feigin and Fridman LLC (57) ABSTRACT

A pipe standing adapter is a device designed for placement on a round pipe to create a flat surface. An interrupting flange, offset from a center and extending parallel to a length of a pipe (between locations about semi-circular openings for a pipe) is on the otherwise flat surface designed for a base of a ladder to be abutted there-against. An acutely angled ladder can then be placed against the interrupting flange and a worker can climb down the ladder safely on to the platform which rests on the pipe.

11 Claims, 6 Drawing Sheets

PIPE ADAPTER FOR LADDER PLACEMENT

FIELD OF THE DISCLOSED TECHNOLOGY

The disclosed technology relates generally a device which rests on a pipe, and more specifically to a flat platform created on the pipe with abutment flange for a ladder.

BACKGROUND

Safety is a number one concern during construction. Trenches are dug and pipes are laid therein, however, entering the trench to do work has a certain level of danger. Standing on a curved pipe can result in slippage and getting hurt. Further, to get down to a pipe laid inside a trench one has to drop their body down the edge of the trench or use a ladder. A ladder is often difficult to safely use because there is no place to put the ladder in a stable manner. It may be possible to place the ladder between the pipe and wall of the trench though this can be unstable.

What is needed is a way to more safely, easily, and securely enter a trench and do work on a pipe therein.

SUMMARY OF THE DISCLOSED TECHNOLOGY

A pipe standing adapter is a device for placing on top of a round pipe to create a flat surface on which to stand and on which to safely rest a ladder. The platform has a flat top side with a flange interrupting, and extending out from, the top side thereof which serves as a place to abut the bottom (feet) of a ladder. This interrupting flange can be prism shaped, such as a rectangular shaped prism, the flange being fixedly attached or integrally formed with the platform and able to withstand forces of an acutely angled ladder used during ordinary usage, from moving the flange relative to the platform. Beneath (on the bottom side of) the platform is at least one semi-circular flange extending away from the platform (meaning, extending away from a plane extending across the flat upper side of the platform). This can be a single, continuous semi-circular flange extending from end to end of the platform, a plurality of spaced apart such semi-circular flanges (such as ribbing) or a semi-circular flange on each side of the device such as one on a left side of the device and another on the right side of the device. An apex (point between ends of the semi-circular shape of the flange and/or center-point of the semi-circular flange) is adjacent to, or is at a bottom side of the platform in embodiments of the disclosed technology. Such two spaced apart semi-circular flanges or multiple such flanges are substantially identical to each other in embodiments of the disclosed technology.

The interrupting flange extends from a left side to a right side of said platform, such as from above one semi-circular flange to being above a second spaced-apart semi-circular flange such as flanges on either end of the platform, in embodiments. Thus, the interrupting flange can be transverse to the arc of the semi-circular flange(s). Two oppositely-disposed fastening mechanisms in embodiments of the disclosed technology are fixedly connected to, or forming a portal into, the platform. This can be a portal on each side of the platform through which a hook with a flexible strap attached; a hook integrated into the platform where a flexible strap is attached; and/or chain links which attach at either side of the platform. With a pipe inserted into the semi-circular flange(s), the flexible strap can extend from two spaced apart regions of the top platform around the pipe, forming a semi-circular region around the pipe and completing a circle with the semi-circular flange, when viewed from the side (e.g. side elevation view).

The pipe standing adapter can be multiple such adapters each with a different circumference of curvilinear/semi-circular flanges. Each adapter corresponds to a different circumferenced-pipe and one is selected based on the pipe to be covered. One then covers the pipe with the selected pipe standing adapter, abuts a ladder at an acute angle to the platform, against the interrupting flange, and can safely climb down the ladder and stand on the pipe.

For purposes of this disclosure, directional descriptors are relative to a typical use of the device with the top side being the flat side with interrupting flange and the bottom side being opposite the top side. A pipe extending there-through extends through front and back sides (or alternatively, left and right sides) of the pipe standing adapter, unless otherwise described. These sides are perpendicular to the top side/platform. Other sides are named accordingly, relative to these sides.

Described another way, a partial rectangular prism is formed from a pipe standing adapter. The partial rectangular prism has a top face (which can be referred to as a "side") which is formed from/is the platform. A flange extends upwards from the platform and acts as a ladder stop in embodiments of the disclosed technology. The opposite bottom face has four corners and a space three-between the four corners. The front and back faces have semi-circular portals along an otherwise solid face. These semi-circular portals end at the four corners of the bottom face. The left face and right face are therefore between the edges of the front face, back face, and top face. A flexible strap can be connected to a bottom side of the top face and pass through/past the opening of the left face and right face. When a pipe is placed between the strap and partial rectangular prism/pipe standing adapter, the flexible strap forms a curvilinear shape having a semi-circular region which is a reflection of the semicircular region of the front and back walls.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A pipe standing adapter is a device for placing on top of a round pipe to create a flat surface on which to stand and on which to safely rest a ladder. The platform has a flat top side with a flange interrupting, and extending out from, the top side thereof which serves as a place to abut the bottom (feet) of a ladder. This interrupting flange can be prism shaped, such as a rectangular shaped prism, the flange being fixedly attached or integrally formed with the platform and able to withstand forces of an acutely angled ladder used during ordinary usage, from moving the flange relative to the platform. Beneath (on the bottom side of) the platform is at least one semi-circular flange extending away from the platform (meaning, extending away from a plane extending across the flat upper side of the platform). This can be a single, continuous semi-circular flange extending from end to end of the platform, a plurality of spaced apart such semi-circular flanges (such as ribbing) or a semi-circular flange on each side of the device such as one on a left side of the device and another on the right side of the device. An apex (point between ends of the semi-circular shape of the flange and/or center-point of the semi-circular flange) is adjacent to, or is at a bottom side of the platform in embodiments of the disclosed technology. Such two spaced apart semi-circular flanges or multiple such flanges are substantially identical to each other in embodiments of the disclosed technology.

Embodiments of the disclosed technology will become clearer in view of the following description of the figures.

Figure 1:
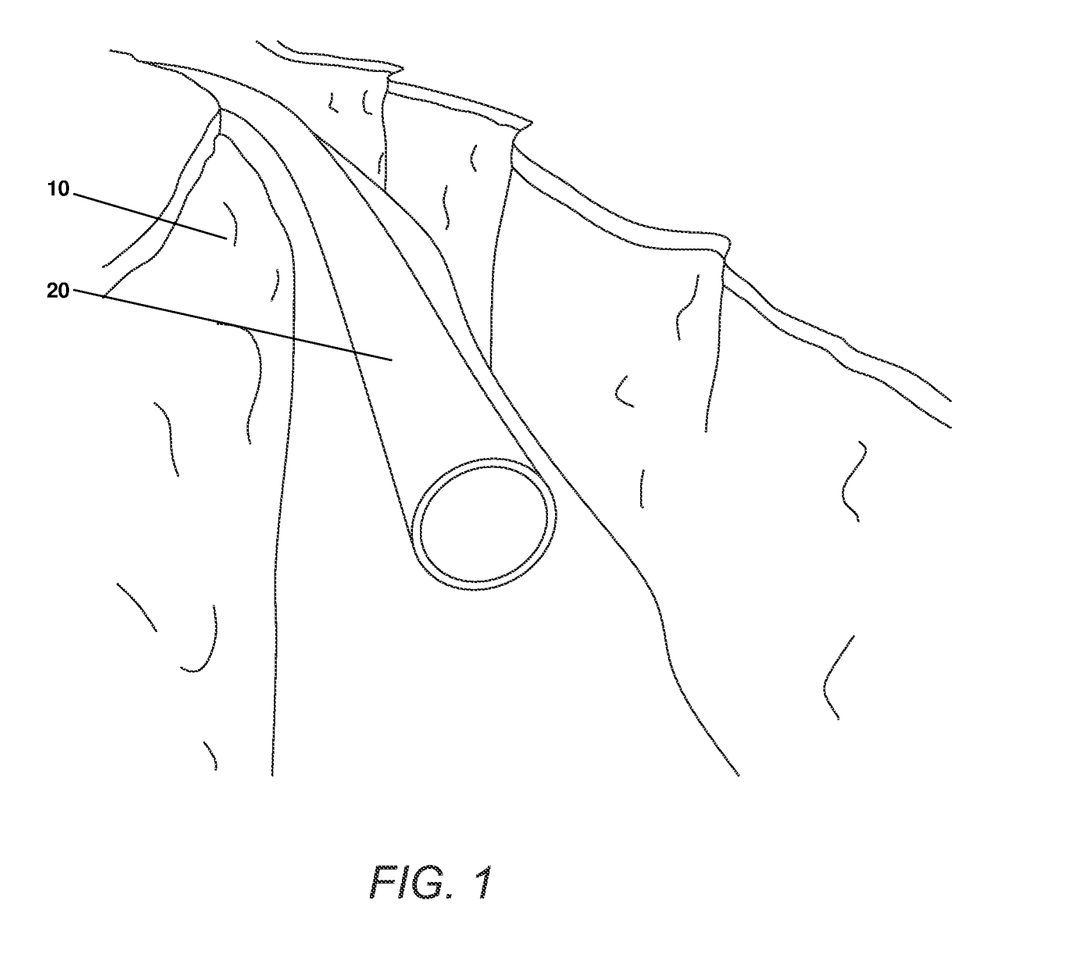
FIG. 1 shows a pipe extending through a trench in an embodiment of the disclosed technology.

FIG. 1 shows a pipe extending through a trench in an embodiment of the disclosed technology. A pipe 20 is shown in a trench 10. A trench is defined as a depression in land with a bottom thereof or side under the pipe 20 being deeper than the pipe 20. Side walls extend between surface level and the bottom thereof or side under the pipe. As such, the pipe 20, or a section thereof, is entirely below ground level in embodiments of the disclosed technology.

Figure 2:
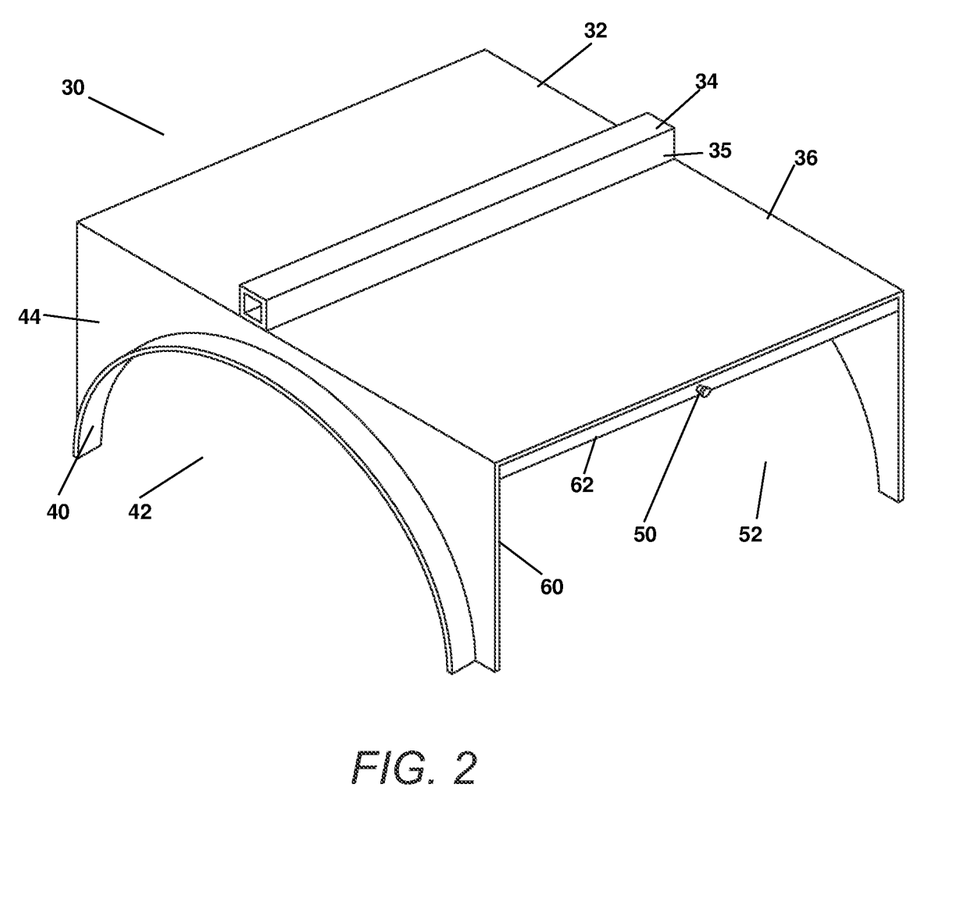
FIG. 2 shows a perspective view of a pipe standing adapter of an embodiment of the disclosed technology.

FIG. 2 shows a perspective view of a pipe standing adapter of an embodiment of the disclosed technology. This adapter or apparatus 30 is designed to be placed over a pipe, such as pipe 20 shown in FIG. 1. The adapter has a top side 32/36 where this is a continuous substantially flat planar side interrupted by a flange 34 (also referred to as an "interrupting flange") extending upwards from the flat planar upper side 32/36 of the pipe standing adapter 30. The flange 34 can have a flat top side and flat side walls 35 (the number "35" refers to each side wall 35 between the flat planar upper side 32/36 and the top side 34 of the flange). The pipe standing adapter is, in some embodiments, procured and made entirely or substantially of a metal or plastic limited to one which is strong enough to withstand the weight of a human person and ladder thereon such as at least 300 lbs (pounds).

The adapter has left/right sides 44 which are mirror images to one another and/or identical to one another and/or substantially identical to one another. That is, element "44" refers to each side as the adapter has a line of symmetry halfway between the two sides (e.g. cut along a vertical plane equi-distant to each of the sides 44). Each side wall 34 has a semi-circular opening or portal 42 defined by a semi-circular flange/extent/edge 40 of the otherwise solid sidewall 44. The edge 40 is configured in embodiments to be equal or substantially equal to a pipe 20 on which the adapter 30 rests when in use. The side walls 44 also have ends 60 which are simultaneously an edge of respective adjacent front/back walls 62.

The front/back walls 62 are perpendicular to the side walls 44 and, in embodiments of the disclosed technology, have a rectangular or square opening 52 therein covering a majority (51%) or large majority (80%) of the front/rear side 62. Again, the front and rear side walls 62 are identical, substantially identical, and/or mirror images of each other. Excepting for the flange 34 there is a vertical line of symmetry halfway between the front and rear sides 62. The flange 34 is offset from a center line between the front/back side 52 as well as offset from a highest region of the arc of the semi-circular edge 40. The front/rear side walls 62 can further have a connecting apparatus 60 such as an outwardly extending pin or flange, or a divet or portal for attachment of another part of a connecting apparatus (such as a hook or flexible strap. In some embodiments the front/side walls 62 are closed/solid completely and in others a small (less than 25%) or tiny (less than 10%) of the wall is solid with the opening or portal 52 being the rest of the "wall".

Figure 3:
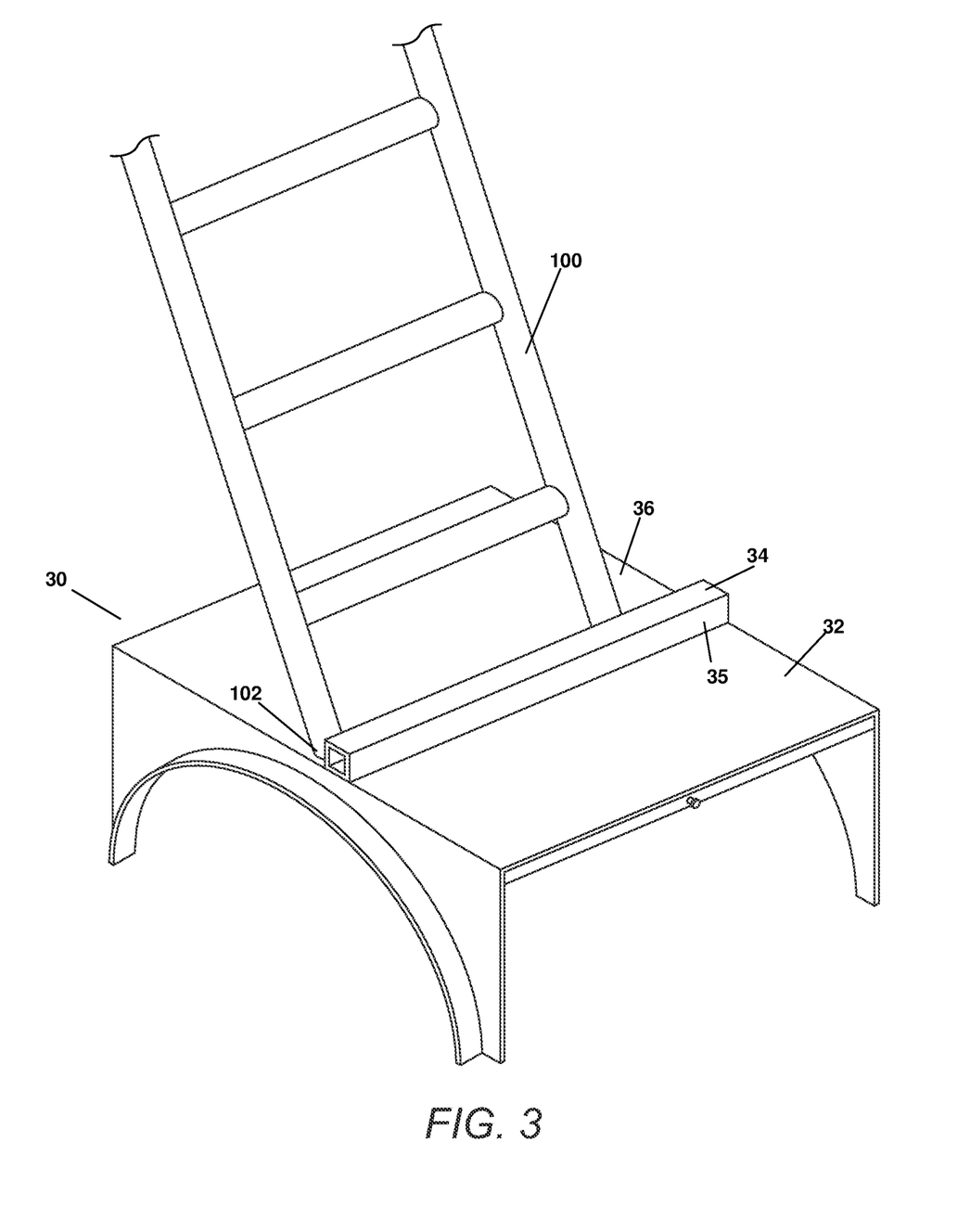
FIG. 3 shows a ladder abutted against an a flange fixedly connected to a top side of the pipe standing adapter of FIG. 2.

FIG. 3 shows a ladder abutted against an a flange fixedly connected to a top side of the pipe standing adapter of FIG. 2. The ladder 100 is angled relative to the flat upper surface 36/32 of the adapter 30 such that an acute angle is formed between the flat upper side 36 and the group consisting of the base of the ladder 102 and/or longest linear extent of the ladder 100. Further, the ladder 100 and base 102 (edge of the ladder and/or where the side and bottom of the ladder join) thereof is abutted against a combination of a portion of the upper wall 36 of the adapter 30 and side flange wall 35. In the version shown, the flange 34 extending upwards from the rest of the adapter 30 is in a rectangular prism shape. Note also that in embodiments of the disclosed technology the flange 34 can be centered between a front/back side or is offset from a center position between the front/back side. The ladder, when the flange 34 is off-center, thus has more than half a width of a trench to extend upwards allowing for a less vertical rise of the ladder compared to if the flange 34 were centered over the pipe 20. This still allows room for a worker to stand on the part of the top wall 32 of the adapter and on to a flat surface which is safer than standing on a circular-shaped pipe. The adapter also allows the safe resting of a ladder thereon which is a stable configuration allowing for a workman to ascend/descend the ladder while the ladder remains in place during such usage thereof.

Figure 4:
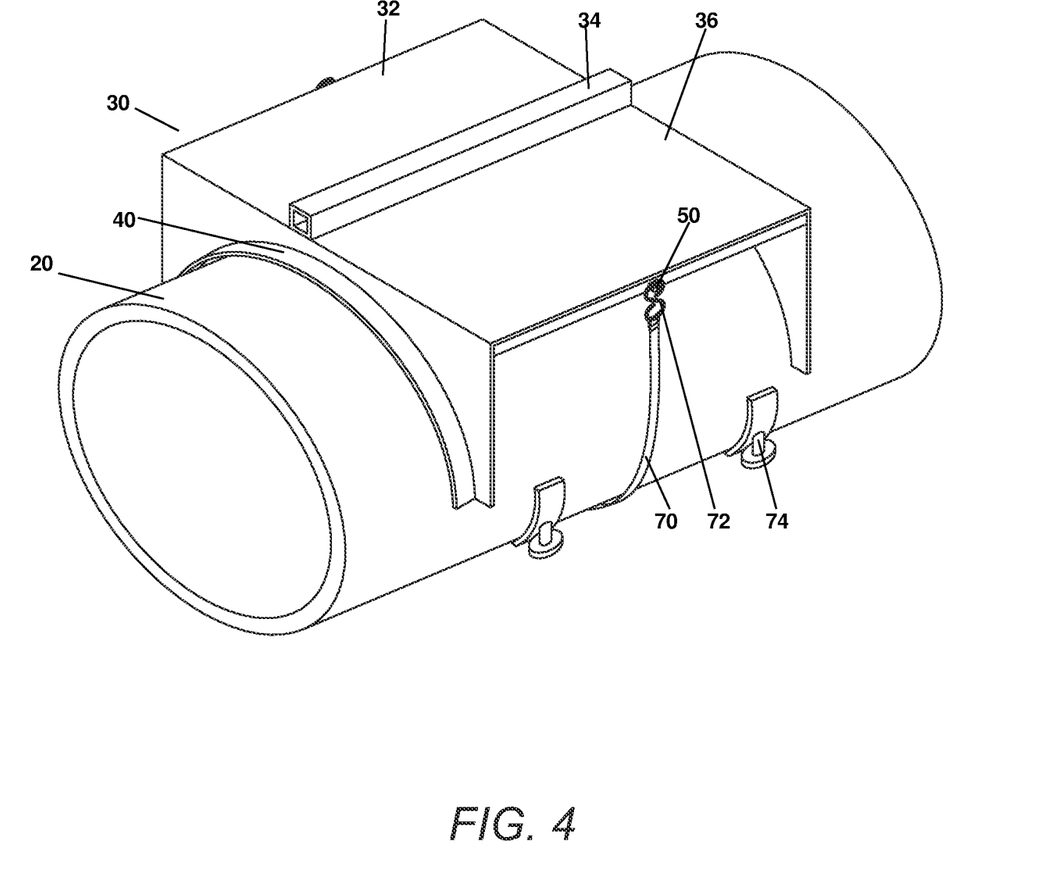
FIG. 4 shows the pipe standing adapter of FIG. 2 removably attached to a pipe.

FIG. 4 shows the pipe standing adapter of FIG. 2 removably attached to a pipe. Here, the adapter 30 is on a pipe 20. The side flange 40 abuts the pipe while the pipe passes through the portals 42. in this manner, the adapter 30 is stably placed on the pipe and, if needed, can be secured by way of a flexible strap 70 which is removably connected to a hook 72 and/or director to a connection mechanism 50. The strap 70, when extending under a pipe, can form a semi-circular configuration or semi-circular portion which touches the pipe 20 with a less circular curvilinear portion on either side which attaches to the connecting mechanism 50 or 72. The connecting mechanism 50 and 72 can be one of, or a combination of, a portal, outwardly extending flange, and/or hook which combine with one another to hold a strap 70. Any connecting mechanism can be used. A "strap" or "flexible strap" is an elongated length of material which is malleable and bendable while retaining structural integrity during ordinary use of the devices shown in FIG. 4 and withstand forces, or is designed to withstand forces, of the adapter 30 sliding relative to the pipe 20. In some embodiments, the strap 70 prevents rotation of the adapter 30 relative to the pipe 20. Note also that feet 74, or supports, which hold the pipe 20 above a ground there-beneath can be used. The strap 70 therefore can pass between the ground (see FIG. 1) and the pipe 20, between multiple feet 74.

Figure 5:
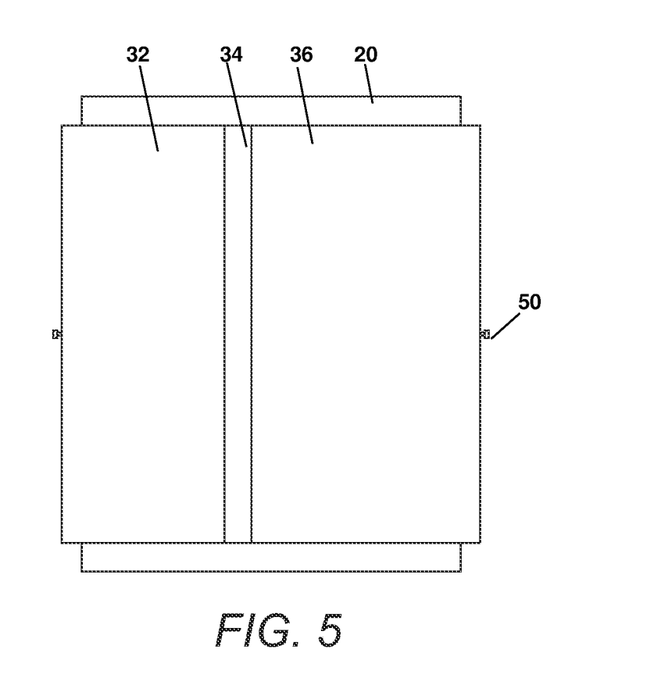
FIG. 5 shows a top plan view of the pipe standing adapter of FIG. 2.

FIG. 5 shows a top plan view of the pipe standing adapter of FIG. 2. In this top plan view one can see a pipe 20 extending under a platform with regions 32 and 36. The interrupting flange 34 extends upwards from the planar surface 32/36 and can have its own planar surface thereabove. The interrupting flange can be 0%, 10%, 20%, 30%, 33%, or 40% off center based upon a need depending depth of a trench, size of a pipe, and length of a ladder.

Figure 6:
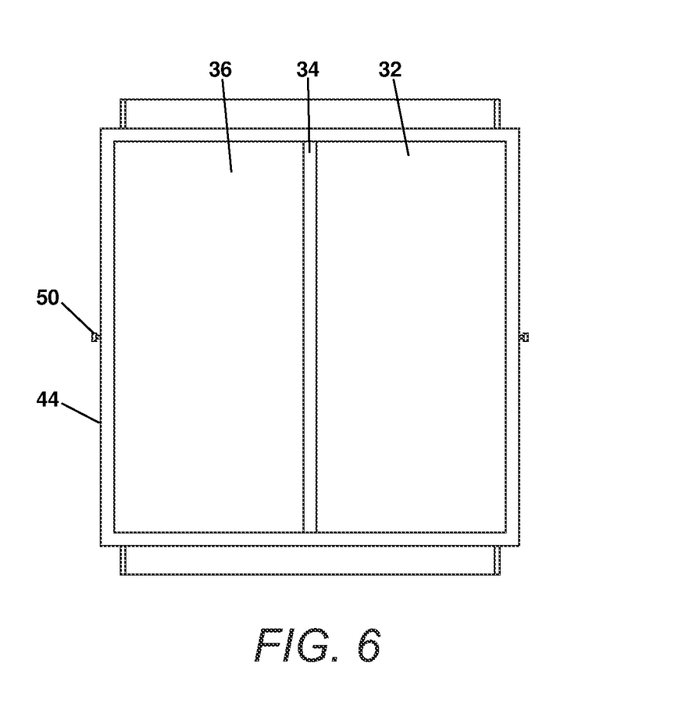
FIG. 6 shows a bottom plan view of the pipe standing adapter of FIG. 2.

FIG. 6 shows a bottom plan view of the pipe standing adapter of FIG. 2. In this version ribbing is below the interrupting flange 34 (the flange being on the opposite side or extending through the flat upper surface 32/36). The side walls portal 44 are also visible.

Figure 7:
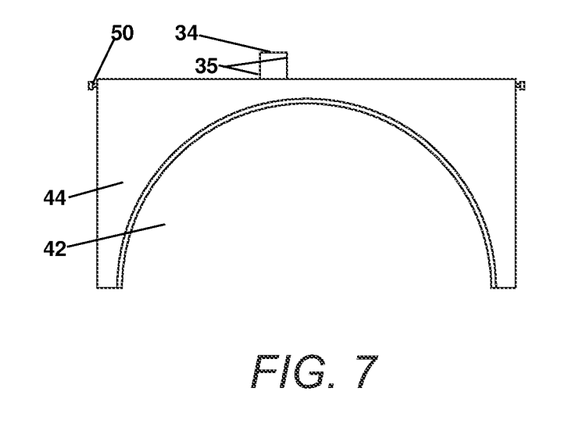
FIG. 7 shows a first side elevation view of the pipe standing adapter of FIG. 2.

FIG. 7 shows a first side elevation view of the pipe standing adapter of FIG. 2. The left/right side walls 44 have a portal 40 which can be semi-circular or curvilinear matching a circumference of a pipe placed thereon. A connector 50 can be on either front/back side and the flange 34 rises above the rest of the adapter 30 with side walled 35. The side walls 35 are used for abutment of the ladder there-against.

Figure 8:
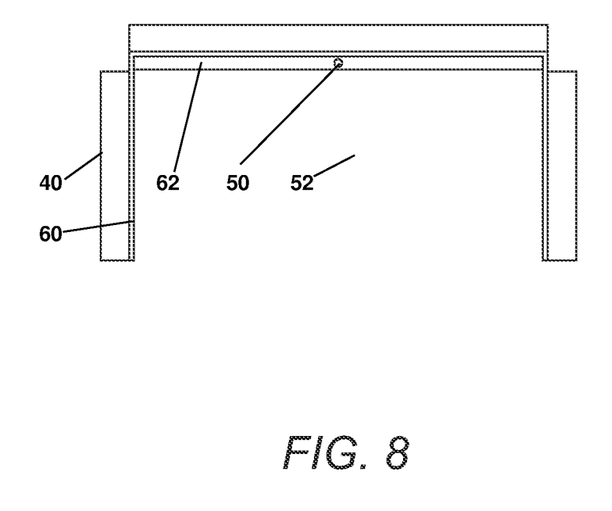
FIG. 8 shows a second side elevation view of the pipe standing adapter of FIG. 2 offset 90 degrees compared to FIG. 7.

FIG. 8 shows a second side elevation view of the pipe standing adapter of FIG. 2 offset 90 degrees compared to FIG. 7. The front/rear walls 62 are shown with a majority opening 52 therein. The semi-circular flange 40 of the side wall is viewable on either side of the edge 60 (side edges) of the front/back side of the adapter 30.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described herein-above are also contemplated and within the scope of the invention.

The invention claimed is:

1. A pipe standing adapter, comprising:
a platform having a top side and a bottom side;
at least one semi-circular flange extending to said bottom side;
an interrupting flange extending above an otherwise flat top side of said platform;
wherein said interrupting flange and an apex of said semi-circular flange are offset from one another,
wherein said at least one semi-circular flange comprises two spaced apart semi-circular flanges, wherein:
a first of said two spaced apart semi-circular flanges extends from said right side of said platform;
a second of said two spaced apart semi-circular flanges extends from a left side of said platform,
wherein said two spaced apart semi-circular flanges are substantially identical,
wherein said interrupting flange is a rectangular prism permanently affixed to said platform, and
wherein said rectangular prism has an internal rectangular prismatic bore.

2. The pipe standing adapter of claim 1, wherein said apex of said semi-circular flange is centered between a front side and rear side of said platform.

3. The pipe standing adapter of claim 2, wherein said interrupting flange extends from a left side to a right side of said platform.

4. The pipe standing adapter of claim 3, wherein said interrupting flange extends across said top side of said platform transverse to said at least one semi-circular flange.

5. The pipe standing adapter of claim 4, wherein said platform and said interrupting flange are adapted to hold an acutely angled base of a ladder in place during regular use of said ladder while said base of said ladder abuts a side of said interrupting flange which is perpendicular to said top side of said platform.

6. A pipe standing adapter, comprising:
a platform having a top side and a bottom side;
at least one semi-circular flange extending to said bottom side;
an interrupting flange extending above an otherwise flat top side of said platform;
wherein said interrupting flange and an apex of said semi-circular flange are offset from one another; and
further comprising two oppositely-disposed fastening mechanisms fixedly connected to, or forming a portal into, said platform and a flexible strap adapted to both extend between said two oppositely-disposed fastening mechanisms and have a circumferential shape when said flexible strap wraps around a portion of a circumference of a pipe, wherein said circumferential shape is smooth and lacks vertices besides for endpoints thereof;
wherein said interrupting flange is a rectangular prism permanently affixed to said platform, and
wherein said rectangular prism has an internal rectangular prismatic bore.

7. A kit comprising multiple pipe standing adapters of claim 6, wherein:
each of said multiple pipe standing adapters has a uniquely circumferenced semi-circular flange from each other of each of said multiple pipe standing adapters; and
each uniquely circumferenced semi-circular flange is equal to a circumference of a pipe adapted to be semi-circularly covered thereby.

8. The pipe standing adapter of claim 7, wherein:
a pipe standing adapter of said multiple pipe standing adapters has a semi-circular flange matching a circumference of a pipe to be covered thereby;
said semi-circular flange of said selected said pipe standing adapter is shaped to be atop said pipe to be covered;
a ladder abuts against said interrupting flange at an acute angle to said platform.

9. A pipe standing adapter forming a partial rectangular prism, said partial rectangular prism comprising:
a flat upper face of said rectangular prism;
a front face with a semi-circular portal therein;
a back face with a semi-circular portal therein substantially equal to said semi-circular portal of said front face;
a left face having a portal between first edges, said first edges also forming part of said front face and said back face;
a right face having a portal between second edges, said second edges also forming part of said back face and said front face;
a bottom face open between each of four corner posts, wherein each of said four corner posts forms an edge of a semi-circular portal of said front face or said back face; and further comprising a flexible strap extending past said front face of said rectangular prism and said back face of said rectangular prism and fixed to a platform which forms part of said upper face of said rectangular prism;

wherein said flexible strap is adapted to wrap around a portion of a circumference of a pipe and comprise a semi-circular section which, when the pipe standing adapter is viewed in a front elevation view, completes a circle with said semi-circular portal of said front face;

further comprising a flange fixedly attached to said flat upper face of said partial rectangular prism;

wherein said flange is a rectangular prism permanently affixed to said platform, and wherein said rectangular prism has an internal rectangular prismatic bore.

10. The pipe standing adapter of claim 9, wherein said flange extends transverse to said semi-circular portal of said front face and said semi-circular portal of said rear face.

11. The pipe standing adapter of claim 10, wherein at least a top face of said flange, said top face being parallel to said flat upper face of said rectangular prism, is closer to said left face of said pipe standing adapter than said right face of said pipe standing adapter.

* * * * *